US008876565B2

(12) United States Patent
Habisch et al.

(10) Patent No.: US 8,876,565 B2
(45) Date of Patent: Nov. 4, 2014

(54) PROTECTIVE HOUSING FOR A PROPELLER OF A SUBMARINE VEHICLE, CONNECTION SYSTEM WITH A CONNECTING CABLE AND THE USE OF SUCH PROTECTIVE HOUSING FOR INCORPORATING A CONNECTING CABLE

(71) Applicant: Atlas Elektronik GMBH, Bremen (DE)

(72) Inventors: Heinz Habisch, Langwedel (DE); Peter Stelke, Tarmstedt (DE); Jorg Kalwa, Weyhe (DE)

(73) Assignee: Atlas Elektronik GmbH (DE)

( * ) Notice: Subject to any disclaimer, the term of this patent is extended or adjusted under 35 U.S.C. 154(b) by 128 days.

(21) Appl. No.: 13/689,227

(22) Filed: Nov. 29, 2012

(65) Prior Publication Data
US 2013/0157531 A1    Jun. 20, 2013

(30) Foreign Application Priority Data

Dec. 14, 2011  (DE) .......................... 10 2011 121 103

(51) Int. Cl.
*B63H 5/16*   (2006.01)
*B63G 8/00*   (2006.01)
*F16G 11/12*  (2006.01)

(52) U.S. Cl.
CPC ................ *B63H 5/165* (2013.01); *B63G 8/001* (2013.01); *F16G 11/12* (2013.01); *B63G 2008/007* (2013.01)
USPC .......................................... 440/72; 24/115 R

(58) Field of Classification Search
CPC .......... F42B 19/00; F42B 19/12; F42B 19/40; F41G 7/00; F41G 2700/005; F42C 13/02; B63G 8/28; B63H 5/165; B63H 20/34; F02B 61/045; F16G 11/00; F16G 11/14; F16G 11/10

USPC ......... 114/20.1, 21.1, 21.2; 440/72; 24/115 R
See application file for complete search history.

(56) References Cited

U.S. PATENT DOCUMENTS 3,565,028 A     2/1971  Hancks et al.
5,637,825 A  *  6/1997  Glenning ..................... 114/21.1
(Continued)

FOREIGN PATENT DOCUMENTS

DE          300526 A5    6/1992
DE     102009053742 A1   5/2011
GB         1530037 A    10/1978

OTHER PUBLICATIONS

International Search Report from corresponding DE 10 2011 121 103.2 filed Dec. 14, 2011.

*Primary Examiner* — Lars A Olson
(74) *Attorney, Agent, or Firm* — Polster Lieder

(57) ABSTRACT

The invention relates to a protective housing for a propeller of a submarine vehicle. The invention also relates to a connection system for a propeller-driven submarine vehicle with a submarine cable and such a protective housing. The invention further relates to the use of a protective housing for a propeller of a submarine vehicle for receiving a strain relief connection for a connecting cable. The invention enables low-cost communication between a propeller-driven submarine vehicle and a support platform by means of a connecting cable which is hydrodynamically streamlined and ensures strain-relief for the connecting cable. The connecting cable is fixed to the periphery of the protective housing, outside the working space of the propeller located on a propeller axis, and a strain-relief cable-holding fixture is arranged for a connecting cable on the submarine vehicle.

14 Claims, 2 Drawing Sheets

(56) References Cited

U.S. PATENT DOCUMENTS

| | | | |
|---|---|---|---|
| 7,574,971 B2 * | 8/2009 | Butts et al. | 114/21.2 |
| 2008/0300742 A1 | 12/2008 | Weaver et al. | |
| 2009/0107388 A1 | 4/2009 | Crowell et al. | |
| 2009/0249991 A1 | 10/2009 | McGeever et al. | |

* cited by examiner

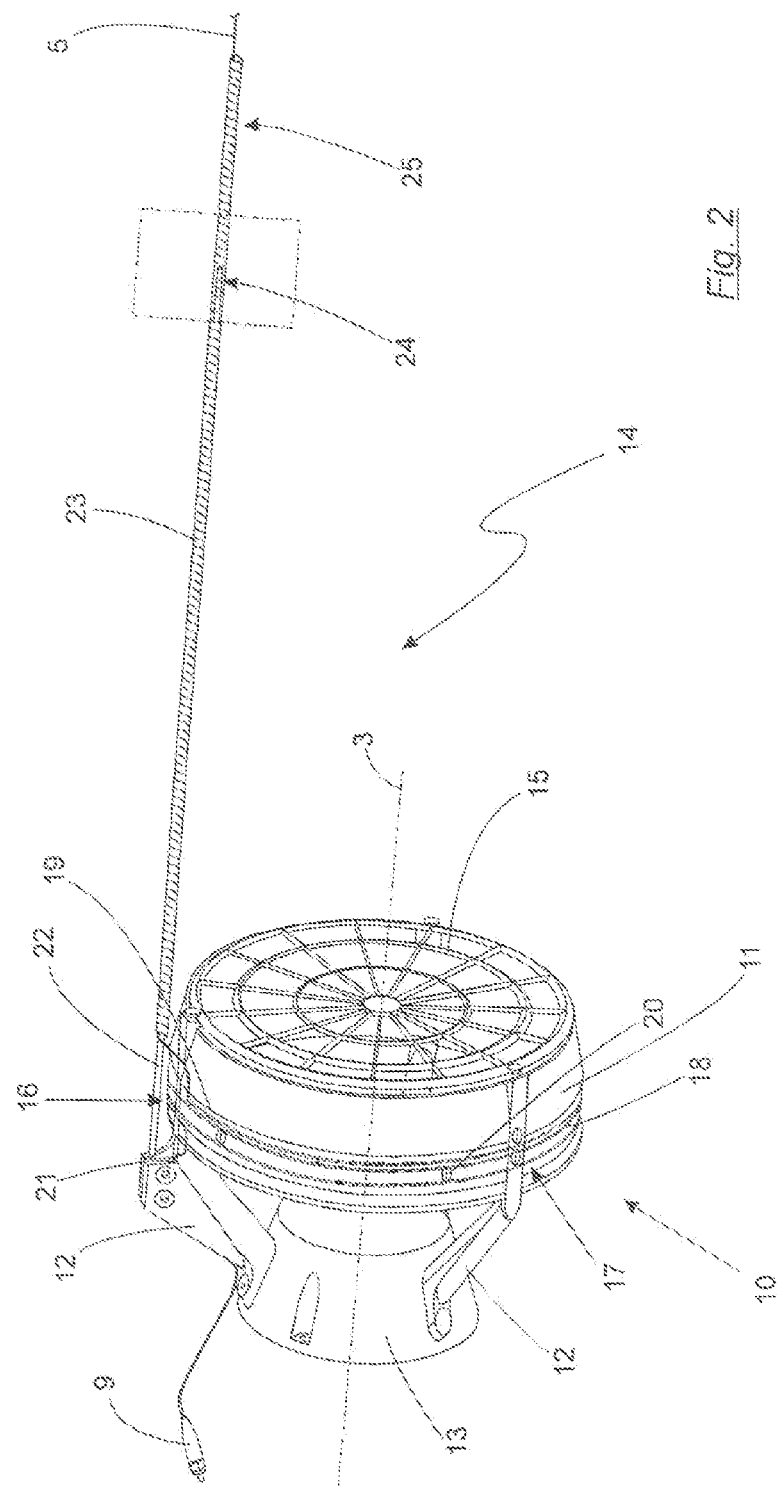

PROTECTIVE HOUSING FOR A PROPELLER OF A SUBMARINE VEHICLE, CONNECTION SYSTEM WITH A CONNECTING CABLE AND THE USE OF SUCH PROTECTIVE HOUSING FOR INCORPORATING A CONNECTING CABLE

CROSS-REFERENCE TO RELATED APPLICATIONS

This application claims the benefit, under 35 U.S.C. §119, of DE 10 2011 121 103.2, filed Dec. 14, 2011, the disclosure of which is incorporated herein by reference in its entirety.

FIELD

The present teachings relate to a protective housing for a propeller of a submarine vehicle and to a connection system for a propeller-driven submarine vehicle with a connecting cable and such a protective housing, and further to the use of protective housing for a propeller of a submarine vehicle for incorporating a strain relief connection for a connecting cable.

BACKGROUND

The statements in this section merely provide background information related to the present disclosure and may not constitute prior art.

In propeller-driven submarine vehicles the propulsion propeller is arranged at the stern of the submarine vehicle in a protective housing, which protects the propeller from damage by, for example, flotsam. For a variety of submarine missions unmanned propeller-driven submarine vehicles are used which, unlike manned submarine vehicles, can achieve greater operating depths and/or operate in environments that are too dangerous for divers or the crews of manned systems. Unmanned submarine vehicles can be broadly divided into remotely operated submarine vehicles (ROV=Remotely Operated Vehicle) and autonomous submarine vehicles (AUV=Autonomous Submarine Vehicle). Remotely operated underwater vehicles (ROVs) are usually controlled by a cable. Commands are generated by a control center on a system platform, e.g. a seagoing vessel, and transmitted via the connecting cable.

Autonomous submarine vehicles (AUVs) complete their particular missions without constant supervision by human operators. Instead they follow a given mission program. Autonomous submarine vehicles can be recognized as they are assembled with a connecting cable connecting them to the system platform. Such hybrid AUVs can provide, in addition to autonomous control over a fiber optic link, data transmitted from sensors to the system platform. The connecting cable can be connected, via a plug and socket connection, to the submarine vehicle.

The connecting cable is usually connected to the stern of the submarine vehicle, so as to ensure a trouble-free connection with the continually moving submarine vehicle, and also to ensure minimum flow resistance to the submarine vehicle.

Throughout the submarine vehicle's mission, the distance between the submarine vehicle and the system platform changes, so that tensile stresses can occur in the connecting cable. In order to avoid such tensile stresses in the connecting cable causing the plug connection between the connecting cable and the submarine vehicle to become loose, i.e. the plug being pulled out of the submarine vehicle, it is usual to employ strain reliefs. With conventional strain reliefs, the connecting cable is wound several times around one or more drums attached to the structure of the submarine vehicle. Because of friction between the connecting cable and the strain relief drums the connecting cable is restrained by the strain reliefs and the end portion of the connecting cable between the strain relief and the plug connector does not have to protect the delicate connecting cable and prevent the plug from being disconnected.

The connection between the connecting cable and the arrangement of strain reliefs on the vehicle structure is complicated by a stern-mounted drive propeller, since the preferred direct locations for the cable connector on the stern are relatively inaccessible because of the position of the propeller. Further, the strain reliefs on the structure of the submarine vehicle create additional unwanted flow resistance.

SUMMARY

The present disclosure addresses this problem and makes possible, at low production cost, a connection between a propeller-driven submarine vehicle and a support platform by means of a connecting cable which is hydrodynamically efficient and ensures a strain-relief cable-holding fixture for the connecting cable.

This problem is solved in the present disclosure by a protective housing for a propeller of a submarine vehicle having on the outside periphery of the protective housing surrounding the working space of the propeller about a propeller axis, a strain-relief cable-holding fixture arranged for a connecting cable of the submarine vehicle. The problem is further solved by a connection system for connecting such a strain-relief cable-holding fixture to a propeller-driven submarine vehicle. Further, the problem is solved by the use of a protective housing for a propeller of a submarine vehicle for attaching a connecting cable at the periphery of the protective housing.

According to the present disclosure, a strain-relief cable-holding fixture for a connecting cable of the submarine vehicle is located on the periphery of the protective housing so that the protective housing is used as an available component for attaching the connecting cable, thereby reducing the number of components, and thus the manufacturing costs. The periphery of the protective housing is made up of those parts and elements of the protective housing which lie outside the designed working space of the propeller on a propeller shaft.

The strain-relief cable-holding fixture is a means for gripping a connecting cable such that, if there is tension in the connecting cable between, the cable-holding fixture and a portion of the connecting cable any tensile forces will have no effect on the cable-holding fixture. The connecting cable is firmly fixed to the cable-holding fixture, so that in the event of tensile forces arising in the connecting cable between the connecting cable and the cable-holding fixture frictional forces are created that are in opposition to these tensile forces and compensate for them. The cable-holding fixture holds the cable firmly along its axis without damaging it. The end portion of the connecting cable, which is connected downstream of the cable-holding fixture on the submarine vehicle, is thus relieved of the effect of the remaining portion of the tensile forces acting on the connecting cable.

In its assembled state, the connecting cable lies on the surface of the component part constituting the cable-holding fixture at the circumference of the protective housing. When tensile stresses occur in the connecting cable, caused by contact between the connecting cable and the cable-holding fixture, frictional forces hold the connecting cable firmly along its axis. The tensile forces in the connecting cable are compensated for in the region of the cable-holding fixture, so that the end portion of the connecting cable lying on the other side of the cable-holding fixture, which carries the connector for connection to the submarine vehicle, are not affected by any tensile forces.

The propeller axis is thus a longitudinal axis of the protective housing which, when it is assembled, coincides with the rotational axis of the propeller. The present disclosure has recognized that, by using the protective housing for providing strain relief for a connecting cable at the periphery of the protective housing, the number of components can be reduced. The periphery of the protective housing provides engineered surface designs which can be used with minimal effort for a strain relief connection for the connecting cable. Especially the periphery of the protective housing external surfaces are available to join the connecting cable to bend-sensitive fiber optic cables with sufficiently large bending radii to ensure the desired strain relief of the connecting cable through frictional contact.

By joining the connecting cable to the periphery of the protective housing the connecting cable can be aligned with a minimum of additional flow resistance while simultaneously providing strain relief. Using a connecting cable and a protective housing over the propeller on the periphery of which a cable-holding fixture is arranged for strain relief of the connecting cable, a connection system is available for a propeller-driven submarine vehicle which provides, in a simple way, a connector for connecting cables, in particular optical fiber cables, on vehicles with only a single propeller at the stern. The present disclosure is not restricted to submarine vehicles with a single stern propeller, but also provides an integrated solution using the propellers' protection to reduce the component count and thus reduce production costs on submarine vehicles with multiple propellers, by using the strain relief cable-holding fixture on the periphery of the protective housing.

In an advantageous embodiment of the present disclosure the strain-relief cable-holding fixture comprises a drum-shaped housing portion of the protective housing, whose periphery is designed to accommodate at least one circumferential winding made by the connecting cable. Instead of the conventional arrangement of strain relief using drums, in which the connecting cable is wound round to protect the plug connector, the drum-shaped housing portion of the protective housing is used for winding on the connecting cable so as to generate compensating frictional forces in these windings in the event of tensile forces. The drum-shaped housing portion is thereby a portion of the protective housing in the axial direction of the propeller axis. When being assembled, the connecting cable has from one to five, e.g., three, coils wound on to the drum-shaped housing portion, in order to ensure secure strain relief.

Advantageously, the cable-holding fixture comprises the drum-shaped housing portion which at least partially axially overlaps an axial clamp band, which is secured to the propeller protective housing. An intermediate space is formed between the axial clamp band and the drum-shaped housing portion. The assembled connecting cable connector system is housed, and the rotating windings of the connecting cable are secured in position, in this space. The connecting cable windings wound on the drum-shaped housing portion thus generate the desired frictional force under tensile loading of the connecting cable via the plug connector's strain relief.

The axial clamp band is fixed advantageously by means of clamping devices on the periphery of the protective housing so that the windings are held in position and generate frictional forces of the appropriate magnitude. Screwed fasteners, especially screws, are the preferred clamping means on the protective housing. These are inserted through holes in the axial clamp band and screwed into the protective housing to fix the axial clamp band.

In a further advantageous embodiment of the present disclosure, the protective housing comprises a rod-shaped cable rod which is aligned substantially parallel to the propeller axis on the protective housing. The cable rod is either a fixed or a detachable part of the periphery of the protective housing. The connecting cable is fixed to and aligned with the cable rod in such a way that the cable rod holds the connecting cable away from the propeller of the submarine vehicle. Because the contact between the connecting cable and the cable rod tensile loads in the connecting cable generate compensating frictional forces, a plug connector strain relief is provided at the end of the connecting cable. The cable rod thus acts as a strain-relief cable-holding fixture. To encourage the generation of frictional forces for strain relief, the connecting cable is advantageously placed in spiral loops around the cable rod. Under tensile loading the connecting cable is pulled along the cable rod.

Advantageously, the cable rod bends elastically, so that its elastic properties prevent the connecting cable from being drawn into the propeller of the submarine vehicle and, any tendency in the connecting cable to bend is counteracted, especially by the end of the cable rod. The cable rod advantageously is made of fiberglass reinforced plastic.

When the connection system is assembled, the connecting cable is attached to the cable rod so that the cable rod is part of the cable-holding fixture. In a preferred embodiment of the present disclosure the cable rod is partially surrounded by a protective sleeve to form an intermediate space for the insertion of the connecting cable. The connecting cable is thus inserted between the cable rod and the protective sleeve and held in place radially, so that the cable rod and the protective sleeve together hold the connecting cable firmly axially by friction and thus form a strain relief for the plug connector at the end of the connecting cable.

The length of connecting cable located within the common portion of the cable rod and the protective sleeve is greater than the axial length of this common portion of the cable rod and the protective sleeve. Thus, the cable is safely held frictionally in the cable-holding fixture between the protective sleeve and the cable rod and, because of the additional length of the connecting cable, even when overcoming frictional forces still ensures strain relief for the connecting cable's plug connector and counteracts any tendency of the connecting cable to tear.

Advantageously, the protective sleeve is made as a spiral tube so that it can be easily fitted on the cable rod. The cable is thus enclosed and the spiral tube is pressed firmly to the cable rod so that there is sufficient contact, and thus friction, between the cable and the cable rod or the spiral tube. The protective sleeve is advantageously designed to be elastic, so that it can move with the cable rod. In a preferred embodiment of the invention the protective sleeve extends beyond the free end of the cable rod whereby this section which extends beyond the end of the cable rod gives additional protection against any undesired bending of the connecting cable.

In a further advantageous embodiment of the present disclosure, on the circumference of the protective housing axial struts are located on the protective housing which are connected to an adapter housing positioned along the propeller shaft wherein at least one of the struts has a cable guide. The connecting cable fixed to the periphery of the protective housing can be led out through the cable guide in the strut and securely mounted, whereby the cable or its connector can be fed into a streamlined central portion located at the rear of the submarine vehicle. The connecting cable is thus securely stowed in the cable guide in the strut.

The protective housing is advantageously constructed as a Kort nozzle and has at its inner periphery a tapered hydrofoil-like profiled ring that surrounds the propeller. The protective housing, as well as acting to protect the propeller from damage, also contributes to reducing flow losses from the tips of the propeller blades.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 2 is an isometric view of connecting system including a protective housing for a propeller of the submarine vehicle shown in FIG. 1 with a fitted connecting cable, in accordance with various embodiments of the present disclosure.

Corresponding reference numerals indicate corresponding parts throughout the several views of drawings.

DETAILED DESCRIPTION

Figure 1:
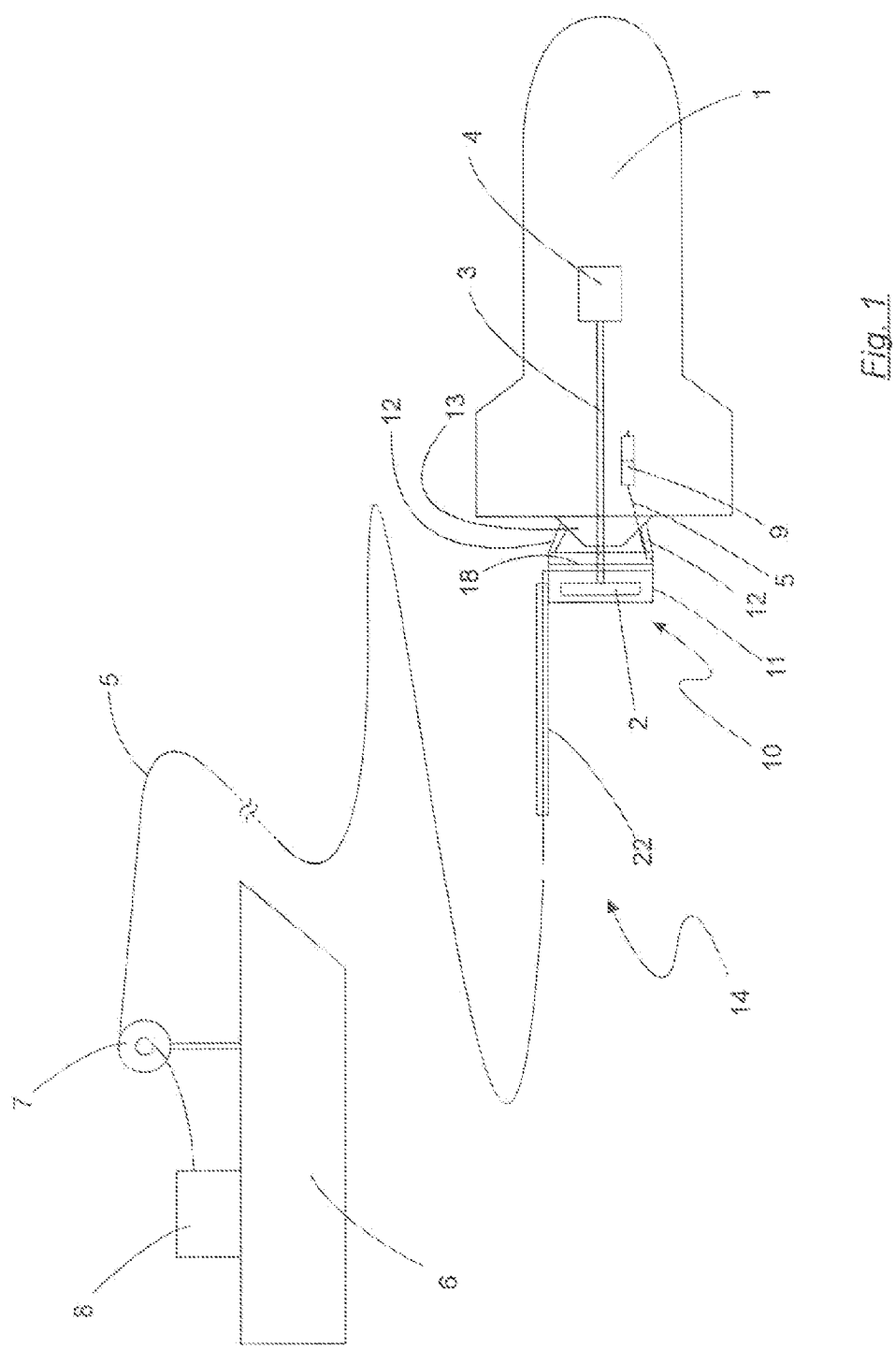
FIG. 1 is a schematic view of a propeller-driven submarine vehicle, which is connected via a connecting cable to a surface vessel, in accordance with various embodiments of the present disclosure.

The following description is merely exemplary in nature and is in no way intended to limit the present teachings, application, or uses. Throughout this specification, like reference numerals will be used to refer to like elements.

FIG. 1 shows an unmanned submarine vehicle 1, which is driven by a stern-mounted propeller 2. The propeller 2 is driven by propeller shaft 3 rotated by a driving motor 4 located inside the submarine vehicle 1.

The submarine vehicle 1 is an autonomous underwater vehicle (AUV) and has navigation and control mechanisms for performing a predetermined autonomous mission. The submarine vehicle 1 is connected via a connecting cable 5 to a support platform, which in the illustrated embodiment, is a surface ship 6. Instead of the surface vessel, the support platform could also be a control room on land. On the surface vessel 6 is a winch 7 on which the connecting cable 5 can be wound or unwound. The connecting cable 5 is connected to a control unit 8 on the ship 6.

The connecting cable 5 is a fiber optic cable, which is used in the embodiment shown for the transmission of sensor data from the submarine vehicle 1 to the control unit 8 in real time.

The connecting cable 5 carries at its free end a connector 9, which can be inserted into a designated receptacle at the stern of the submarine vehicle 1 in order to provide a signaling connection between the submarine vehicle 1 to the control unit 8 of the support platform.

The propeller 2 of the submarine vehicle 1 is located in a form of Kort nozzle protective housing 10, which is hereinafter described in more detail with reference to FIG. 2. The protective housing 10 covers the blade tips of the propeller 2 with a housing ring 11 that has on its inner surface a hydrofoil-like profile in the axial direction of the propeller shaft 3, thereby preventing any damage to the propeller 2 and also reducing flow losses from the tips of the propeller blades. On the housing ring 11 of the protective housing 10, which is an essential part of the Kort nozzle, axial struts 12 are formed centrally disposed along the propeller shaft 3 which are connected to an adapter housing 13 of the protective housing 10. In the illustrated embodiment, three struts 12 are uniformly arranged on the circumference of the housing ring 11, through which the adapter housing 13 carries the housing ring 11 for receiving the propeller 2. The adapter housing 13 is itself tapered in order to promote the beneficial effects of Kort nozzle flow. The adapter housing 13 is shaped so that it can be attached to the stern of the submarine vehicle 1.

The protective housing 10 and the connecting cable 5 are parts of a connection system 14, which enables a connection to be made between the submarine vehicle 1 and the support platform (surface vessel 6) with a streamlined and strain relief connection for the connecting cable 5 to the submarine vehicle 1. The connection system 14 including the protective housing 10 for the propeller 2 and with the connecting cable 5 is explained in detail with reference to FIG. 2. The same feature reference numbers are used in FIG. 2 as FIG. 1.

Referring now to FIGS. 1 and 2, the protective housing 10 is substantially rotationally symmetrical about a longitudinal axis of the protective housing 10, which coincides in the installed position with the propeller shaft 3. A guard 15 arranged perpendicular to the propeller axis closes the housing 10 and covers the propeller in its installed position.

At the periphery of the protective housing 10, i.e., the part that is radially beyond the intended working space of the propeller 2 lying around the propeller shaft 3, a strain-relieving cable-holding fixture 16 is located, which provides strain relief for the connecting cable 5. The strain-relief cable-holding fixture 16 includes a drum-shaped housing portion 17 of the protective housing 10, around the periphery of which the connecting cable 5 is wound up in sections and relieves the plug 9 of tensile forces. The windings 18 of the connecting cable 5 are in contact with the surface of the drum-shaped housing portion 17, so that when there is tension in the connecting cable 5 compensating frictional forces are generated.

Adequate strain relief is achieved with an arrangement of three windings 18. By the arrangement of the windings 18 of the connecting cable 5 on the circumference of the drum-shaped housing portion 17, a strain-relief cable-holding fixture 16 is provided at the periphery of the protective housing 10, ensuring that no further components are required to ensure strain relief. The use of the protective housing 10 for the propeller 2 of the submarine vehicle 1 for receiving the connecting cable 5 on the drum-shaped housing portion 17 of the protective casing 10 is an integrated solution with low production costs for providing a strain relief connection for the connecting cable which is achieved through using the already existing protective housing 10. Furthermore, the hydrodynamic resistance of the protective housing 10 is affected only marginally by the fitting of the cable-holding fixture 16 on the periphery of the protective housing 10.

The windings 18 are held and clamped axially by the overlapping axial clamp band 19 on the drum portion 17, so that the windings 18 are fixed in the installed position and the generation of frictional forces between the windings 18 and the adjacent components is ensured by tension in the connecting cable 5. The circumferential axial clamp band 19 is fixed by means of fastening screws 20 on the outer side of the housing ring 11 and thus to the periphery of the protective housing 10. The fastening screws 20 thereby form a clamping means for clamping the windings 18 of the connecting cable 5.

When the connecting cable 5 has been fitted into the connection system 14 by one or more coils 18 being wound onto the drum section 17, the axial clamp band 19 is slipped over the windings 18 and the connecting cable 5 is clamped in the space between the axial clamp band 19 and the protective housing 10.

Through the circumferential coils 18 the corresponding length of the connecting cable wound around the drum-shaped housing section 17 is in contact with the periphery of the protective housing 10, so that when the connecting cable is in tension sufficient friction occurs to compensate for the tensile forces.

A cable guide 21 is formed in at least one of the struts 12, through which the end portion of the connecting cable 5 is fitted to the plug 9. The connecting cable 5 is safely stowed and protected from the flow of water during the operation of the submarine vehicle 1 by the cable guide 21. The connecting cable 5 is guided radially inwards in the vicinity of the adaptor housing 13 via the cable guide 21 in the strut 12. The plug 9 can then also be inserted directly into a connecting device at the stern of the sub-marine vehicle 1, so that any exposed portions of the connecting cable 5 are avoided. The cable guide 21 is a channel which is formed in the strut 12 as a recessed groove or bore.

In the periphery of the protective housing 10, a rod-shaped cable rod 22 is arranged on the protective housing 10, which aligns and directs the connecting cable 5. The cable rod 22 is oriented substantially parallel to the propeller shaft 3. In the illustrated embodiment it is about 50 cm long and is made of fiberglass reinforced plastic. The cable rod 22 is fixed to the strut 12 which, in its cable guide 21, accepts the end portion of the connecting cable 5 with the plug 9. Therefore, only a very short portion of the connecting cable 5 is exposed in the area between the windings 18 clamped by the axial clamp band and the portion of the connecting cable 5 accommodated by the cable rod 22.

The connecting cable 5 is led through and held radially between the cable rod 22 and a protective sleeve 23. The cable rod 22 thereby holds the connecting cable 5 away from the propeller 2 and prevents the connecting cable 5 from fouling the propeller while the submarine vehicle 1 is operating. Moreover, the cable rod 22 is flexurally elastic and thus resists any undesirable bending of the connecting cable 5, which can lead to damage of the connecting cable 5, in particular to a fiber optic cable.

The protective sleeve 23 surrounds the cable rod 22 to form a gap through which the connecting cable 5 is guided. The protective sleeve 23 thereby holds the connecting cable 5 firmly and ensures firm contact between the connecting cable 5 and the surface of the cable rod 22. In this manner, the cable rod 22, or that portion of the cable rod covered by the protective sleeve 23 forms a strain-relief cable-holding fixture, whereby tensile forces in the connecting cable 5 can be compensated for by the friction between the connecting cable 5 and the cable rod 22.

The protective sleeve 23 is formed as a spiral tube, so that during assembly of the connection system 14, the connecting cable 5 can be inserted via a narrow opening in the spiral tube on to the cable rod 22. For long connecting cables 5 the protective sleeve in the form of a spiral tube 23 can also fitted directly on to the end portion of the connecting cable 5 that carries the plug 9.

If fitting a protective sleeve 23 designed in the form of a spiral tube on to the cable rod 22, the connecting cable 5 should not be held in a straight line but rather kept in more or less wavy sections when pulling on the protective sleeve 23.

The protective sleeve 23 designed as a spiral tube is flexible, so that the cable rod 22, which is also elastic, can compensate for sideways pulling of the connecting cable 5 by bending in the direction of those forces that are acting sideways. The protective sleeve 23 extends beyond the free end 24 of the cable rod 22. The protruding portion 25 beyond the free end 24 of the cable rod 22 stabilizes the end of the connecting cable 5 it encloses and, due to the lack of any cable rod 22 core, provides greater flexibility. The protective sleeve 23 thus extends the cable rod 22 with a flexible portion 25, thereby providing improved protection of the sensitive optical fiber against damage caused by bending at the end of the cable rod 22.

In the illustrated connector system 14 there is, in addition to the strain relief cable-holding fixture 16 on the drum-shaped housing portion 17, a further strain relief provided by the attachment of the connecting cable 5 to the cable rod 22 through the protective sleeve 23.

There are possible embodiments in which the strain relief connection measures shown here for the connecting cable 5 at the periphery of the protective housing 10 may be provided individually. In particular, an advantageous embodiment is one in which strain relief is ensured by the attachment of the connecting cable 5 to the cable rod 22 in the illustrated embodiment without winding the connecting cable 5 on to the drum-shaped housing portion. Here the connecting cable 5 is clamped directly to the end of the cable rod 22 through the strut 12 to the plug 9, i.e. without the arrangement of additional strain relief contributing by the windings 18.

All the descriptions above and the features mentioned in the claims are in accordance with the invention either individually or in any combination with one another. The disclosure of the invention is therefore not limited to the disclosed or claimed combinations of features. Rather, all combinations of individual features as disclosed can be considered.

Furthermore, the description herein is merely exemplary in nature and, thus, variations that do not depart from the gist of that is described are intended to be within the scope of the teachings. Such variations are not to be regarded as a departure from the spirit and scope of the teachings.

What is claimed is:

1. A protective housing for a propeller of a submarine vehicle, said housing comprising, a strain-relief cable-holding fixture for a connecting cable of the submarine vehicle, the strain-relief cable-holding fixture arranged on the outside periphery of a protective housing surrounding a working space of a propeller about a propeller axis, wherein the periphery of the protective housing comprises a rod-shaped cable rod that is disposed substantially parallel to the propeller shaft and located on the protective housing.

2. The protective housing according to claim 1, wherein the cable-holding fixture comprises a drum-shaped housing portion of the protective housing, a periphery of the drum-shaped housing designed to accommodate at least one circumferential winding made by the connecting cable.

3. The protective housing according to claim 2, wherein the cable-holding fixture comprises the drum-shaped housing portion that at least partially axially overlaps an axial clamp band that is secured to the protective housing by a clamping device.

4. The protective housing according to claim 3, wherein the clamping device in the protective casing comprises threaded fastening screws.

5. The protective housing according to claim 4, wherein the cable rod is flexurally elastic.

6. The protective housing according to claim 5, wherein the cable rod is surrounded in sections by a protective sleeve forming an intermediate space for the insertion of a connecting cable, wherein the cable rod and the protective sleeve form a strain relief.

7. The protective housing according to claim 6, wherein the protective sleeve is formed as a spiral tube.

8. The protective housing according to one of claim 7, wherein the protective sleeve is elastic.

9. The protective housing according to claim 8, wherein the protective sleeve extends beyond a free end of the cable rod.

10. The protective housing according to claim 4, wherein axial struts are located on the protective housing that are connected to an adapter housing located along the propeller shaft wherein at least one of the struts has a cable guide.

11. A connection system for a propeller driven submarine vehicle, said connecting system comprising:
a connecting cable of the submarine vehicle; and
a protective housing for a propeller of a submarine vehicle, said housing comprising, a strain-relief cable-holding fixture for the connecting cable, the strain-relief cable-holding fixture arranged on the outside periphery of a protective housing surrounding a working space of a propeller about a propeller axis, wherein the periphery of the protective housing comprises a rod-shaped cable rod that is disposed substantially parallel to the propeller shaft and located on the protective housing.

12. The system according to claim 11, wherein the connecting cable is wound on a drum-shaped portion of the protective housing, said windings of the connecting cable are clamped by means of a rotating axial clamp band on the drum-shaped portion.

13. The system according to claim 12, wherein a periphery of the protective housing comprises a rod-shaped cable rod that is substantially parallel to a propeller shaft of the submarine vehicle and located on the protective housing, the cable rod being surrounded in sections by a protective sleeve forming an intermediate space for the insertion of the connecting cable, wherein the cable rod and the protective sleeve form a strain relief, and wherein the connecting cable between the cable rod and the protective sleeve is led out and held radially.

14. A method for providing a strain relief connection for a connecting cable of a submarine vehicle, said method comprising;
using of a protective housing for a propeller of the submarine vehicle for providing the strain relief connection for the connecting cable at the periphery of the protective housing; and
aligning and directing the connecting cable using a rod-shaped cable rod connected to the periphery of the protective housing and disposed substantially parallel to the propeller shaft and located on the protective housing.

* * * * *